US008095978B1

(12) United States Patent
Gandhi et al.

(10) Patent No.: US 8,095,978 B1
(45) Date of Patent: Jan. 10, 2012

(54) METHOD AND SYSTEM FOR MANAGING PORTS IN A HOST BUS ADAPTER

(75) Inventors: Rajendra R. Gandhi, Laguna Niguel, CA (US); Parag P. Mehta, Ladera Ranch, CA (US)

(73) Assignee: QLOGIC, Corporation, Aliso Viejo, CA (US)

( * ) Notice: Subject to any disclaimer, the term of this patent is extended or adjusted under 35 U.S.C. 154(b) by 955 days.

(21) Appl. No.: 11/761,279

(22) Filed: Jun. 11, 2007

(51) Int. Cl.
*G06F 21/00* (2006.01)
(52) U.S. Cl. .......................................... 726/20
(58) Field of Classification Search .................. 726/3–5, 726/20
See application file for complete search history.

(56) References Cited

U.S. PATENT DOCUMENTS

| | | | | |
|---|---|---|---|---|
| 7,386,708 | B2 * | 6/2008 | Bantz et al. | 712/226 |
| 7,673,074 | B1 * | 3/2010 | Sebastian et al. | 709/250 |
| 2004/0177175 | A1 * | 9/2004 | Pellegrino et al. | 710/30 |
| 2009/0089871 | A1 * | 4/2009 | Murphy et al. | 726/11 |

OTHER PUBLICATIONS

HP Storage Works San Switch 2/8V, 2/16V, 2/16M, and 4/32 Installation Guide, Jan. 2005.*
"SFP (Small Formfactor Pluggable) Transceiver", Agilent Technologies, et al., Rev. 1.0, May 12, 2001.

* cited by examiner

*Primary Examiner* — Nasser Moazzami
*Assistant Examiner* — Lisa Lewis
(74) *Attorney, Agent, or Firm* — Klein, O'Neill & Singh, LLP

(57) ABSTRACT

A method and a host bus adapter (HBA) are provided. The HBA includes a first port that is enabled for use in a storage area network; and a second port that is enabled after a user acquires a transceiver with a security key, wherein the HBA firmware reads the security key and validates the transceiver and enables a function for the second port. The method includes coupling a transceiver to an inactive port, wherein the transceiver stores a security key; validating the transceiver by reading the security key; enabling a function for the inactive port; downloading a software component for the inactive port; and operating the host bus adapter with more than one functional port.

19 Claims, 3 Drawing Sheets

METHOD AND SYSTEM FOR MANAGING PORTS IN A HOST BUS ADAPTER

BACKGROUND

1. Field of the Invention

The present invention relates to computing systems, and more particularly, to managing ports in host bus adapters.

2. Background of the Invention

Storage area networks ("SANs") are commonly used to share and manage data. In SANs, plural memory storage devices are made available to various computing systems (also referred to as host systems). Data in a SAN is typically moved between plural host systems and storage systems (or storage devices, used interchangeably throughout this specification) through various controllers/adapters.

Host systems often communicate with storage systems via a controller/adapter known as a host bus adapter ("HBA"), using a local bus standard, such as the Peripheral Component Interconnect ("PCI," "PCI-X", or "PCI-Express," all used interchangeably throughout the specification) bus interface. The PCI, PCI-X and PCI-Express standards are all incorporated herein by reference in their entirety.

HBAs communicate with network devices in a SAN via ports. A HBA may be a single port HBA, a dual port HBA or a multi-port HBA (i.e. more than two ports). Typically, a single port HBA has one port to access a network while a dual port HBA has two ports.

A user typically buys a single port HBA or a dual port HBA depending on user network needs. When a user buys a single port HBA, the user is limited to only a single port. If in the future (i.e. after the purchase of single port HBA), the user needs more than one port then the user has to buy a new dual port (or multi-port) HBA. Current systems do not provide the user with an option for upgrading a single port HBA to a dual port HBA.

Therefore, there is a need for a flexible system and method for upgrading ports of a HBA.

SUMMARY OF THE INVENTION

In one embodiment, a host bus adapter (HBA) is provided. The HBA comprises a first port that is enabled for use in a storage area network; and a second port that is enabled after a user acquires a transceiver with a security key, wherein the HBA firmware reads the security key and validates the transceiver and enables a function for the second port.

In another embodiment, a method for enabling a port in a host bus adapter (HBA) is provided. The method includes coupling a transceiver to an inactive port, wherein the transceiver stores a security key; validating the transceiver by reading the security key; enabling a function for the inactive port; downloading a software component for the inactive port; and operating the host bus adapter with more than one functional port.

In yet another embodiment, a storage area network is provided. The storage area network comprises a host system that reads and writes information to a storage system; and a host bus adapter operationally coupled to the host system and includes a first port that is enabled for use in a storage area network; and a second port that is enabled by after a user acquires a transceiver with a security key, wherein firmware for the HBA reads the security key and validates the transceiver and enables a function for the second port.

This brief summary has been provided so that the nature of the invention may be understood quickly. A more complete understanding of the invention can be obtained by reference to the following detailed description of the various embodiments thereof concerning the attached drawings.

BRIEF DESCRIPTION OF THE DRAWINGS

The foregoing features and other features of the present invention will now be described with reference to the drawings of various embodiments. In the drawings, the same components have the same reference numerals. The illustrated embodiments are intended to illustrate, but not to limit the invention. The drawings include the following Figures.

DETAILED DESCRIPTION OF THE PREFERRED EMBODIMENTS

To facilitate an understanding of the various embodiments, the general architecture and operation of an overall system will be described. The specific architecture and operation of the various embodiments are then described with reference to the general architecture.

System Overview

Figure 1A:
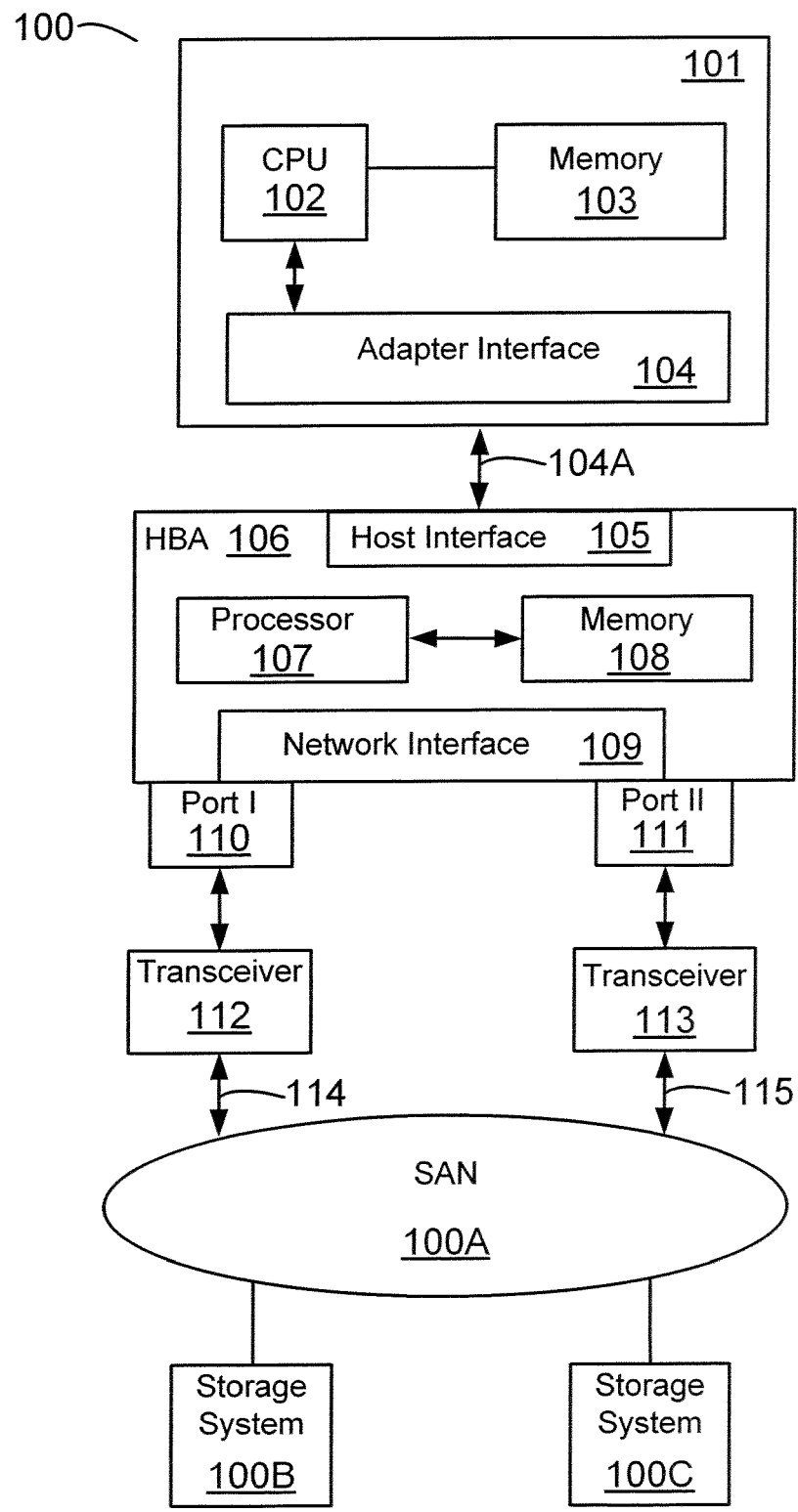
FIG. 1A shows a top level diagram of a network system, according to one embodiment.

FIG. 1A shows a block diagram of system 100. System 100 includes a host computing system 101 (may also be referred to as host system) with a central processing unit ("CPU") 102 that executes program instructions out memory 103. Host memory 103 is coupled to CPU 102 via a system bus or a local memory bus. Memory 103 is used to provide CPU 102 access to data and/or program information that is stored in main memory 103 at execution time. Typically, memory 103 is composed of random access memory (RAM) circuits. Among other information, host memory 103 stores a driver (HBA driver 118, FIG. 1B) that co-ordinates all data transfer via adapter 106 using input/output control blocks ("IOCBs"). A computer system with the CPU and main memory is often referred to as a host system.

It is noteworthy that host system 101 may include a computer, server or other similar devices, which may be coupled to storage systems.

Host system 101 interfaces with a HBA 106 via adapter interface 104, host interface 105, and bus 104A. Bus 104A may be a PCI, PCI-X, PCI-Express or any other standard/non-standard bus. The bus specifications are incorporated herein by reference in their entirety. Host interface 105 includes logic and circuitry to handle the type of bus that is being used and performs standard interface functions, for example, signal conversion and others. In one embodiment, host interface 105 is a PCI interface.

Adapter 106 has various components, including a central processor (which may be a reduced instruction set computing "RISC" processor) 107. Processor 107 executes program instructions (firmware) out of memory 108 to control overall HBA 106 operations.

HBA 106 communicates with other networked devices (for example, storage systems 100B and 100C as part of a SAN 100A) via a network interface 109 and network links (114, 115). Different standard network protocols may be used to facilitate this communication. For example, Fibre Channel, iSCSI, Infiniband and others can be used. The protocol standards are incorporated herein by reference in their entirety. Network interface 109 includes logic and circuitry to process incoming and outgoing information based on these different protocols. For example, for a Fibre Channel network, network interface 109 includes a Fibre Channel Protocol Manager (FPM) and buffers for processing incoming and outgoing Fibre Channel frames.

Adapter 106 communicates with other devices/system using ports (110, 111) via network interface 109. Transceivers (112, 113) enable communications between ports (110, 111) and storage systems 100B and 100C via network links (114, 115). Transceivers are communication devices capable of both transmitting and receiving network information.

A single port HBA communicates via a single port using a single transceiver over a network connection, while a dual port HBA communicates via dual ports and dual transceivers over dual network connections. For example, a single port HBA communicates via Port I (110) and transceiver (112) with other devices/system via network link 114. A dual port HBA communicates via dual ports (Port I and Port II, 110 and 111, respectively) and transceivers (112 and 113) via network links 114 and 115.

QLogic Corporation, the assignee of the present application, designs and manufactures different type of HBAs. More information on these HBAs is available from QLogic's website located at qlogic.com.

Figure 1B:
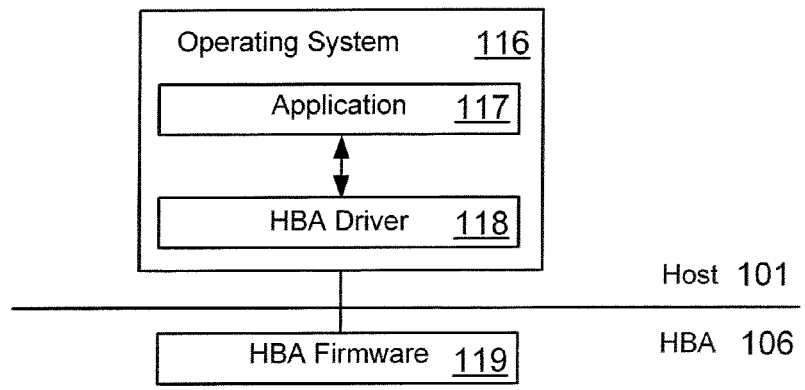
FIG. 1B shows a software architecture for operating a HBA, according to one embodiment.

FIG. 1B shows a block diagram of the overall software architecture for operating HBA 106. Operating system 116 controls overall operation of host system 101 and may be Unix, Windows or Linux based. It is noteworthy that the present invention is not based on any particular operating system.

Application 117 is a software program executed in host system 101, and may be used to read and write data to storage systems 100B and 100C. Application 117 sends commands via HBA driver 118 that interfaces with HBA 106. HBA firmware 119 executed out of memory 108 interfaces with HBA driver 118.

Figure 1C:
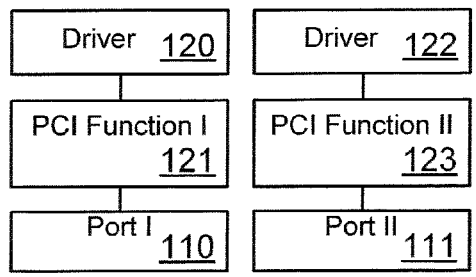
FIG. 1C shows different HBA ports operating with associated drivers, according to one embodiment.

HBA 106 supports multiple PCI functions. Each PCI function communicates and controls a network port. Separate drivers are used for supporting different PCI functions. Each PCI function and its associated network port are controlled by its own driver (or multiple instances of the same driver code running in the host system for each PCI function). For example, HBA driver 118 includes two driver components, component I (120) and component II (122) for PCI functions 121 and 123, for ports 110 and 111, respectively, as shown in FIG. 1C. Driver 120 is used for controlling Port I 110 using PCI function I (121). Similarly, for controlling Port II (111) using PCI function II (123), a driver component II (122) is used. Hence, for a dual port HBA (Port I and II, 110 and 111), to control both ports using PCI functions I and II (121, 123), both driver components (120 and 122) are used.

Currently, a user may buy a single port HBA or a dual port HBA. A single port HBA provides access to either port I (110) or port II (111). If the user wants to upgrade to a dual port HBA, the user needs to buy a dual port HBA having two active ports. Currently, the user does not have an option of upgrading an existing single port HBA to a dual port HBA.

The present invention overcomes this problem and provides a HBA that has an active port, and an inactive port. The inactive port may be activated by buying a custom transceiver with a built-in security key. The security key is validated by the HBA, which then enables a second PCI function. The driver for the second PCI function is attached (or initialized) when the HBA forces rescan of a PCI system hierarchy. The driver for the second function then enables second network port for normal operation.

In one aspect, a user purchases a HBA with at least two ports (Port I 110 and Port II 111) and with an enabled transceiver attached to one port and an empty transceiver cage (not shown) for the second port. The HBA has at least one active port, while the other port(s) may be inactive. The single port HBA is assembled to include all the components except a transceiver to operate the second port. To upgrade the single port HBA to a dual port HBA, a user may activate the second port by buying a custom transceiver. The custom transceiver includes a security key, which is used to activate the second port.

Figure 1D:
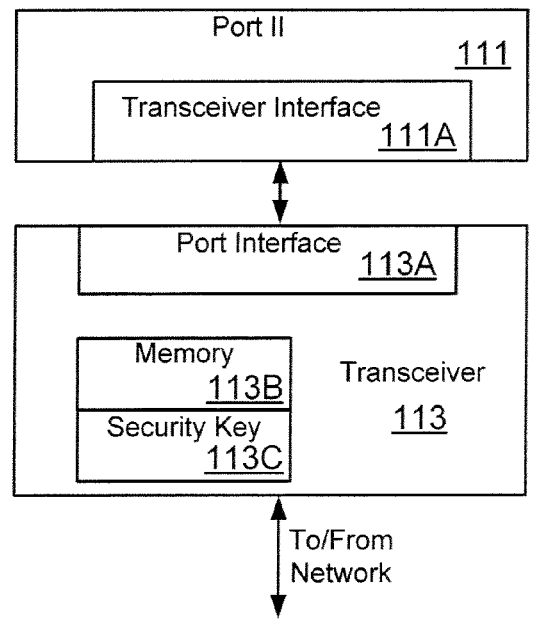
FIG. 1D shows a block diagram of a custom transceiver interfacing with an HBA port, according to one embodiment.

FIG. 1D shows a block diagram of a custom transceiver 113 interfacing with port II 111. Transceiver 113 includes a port interface 113A that includes logic and circuits to interface with transceiver interface 111A in Port 111. Transceiver 113 also includes security key(s) 113C stored in a non-volatile memory 113B. When a user plugs in transceiver 113 in Port 111, the security key 113C is read by HBA firmware 119. The security key 113C is validated by HBA 106 either by executing code stored in HBA memory 108, or by a remote server (not shown).

After security key 113C is validated, HBA firmware 119 makes a second PCI function (123, FIG. 1C) visible to system 101. The driver component 122 for the second port and the second PCI function is then downloaded (or attached/initialized) when system 101 rescans the PCI hierarchy and thereafter, HBA 106 can function as a dual port HBA.

Figure 2:
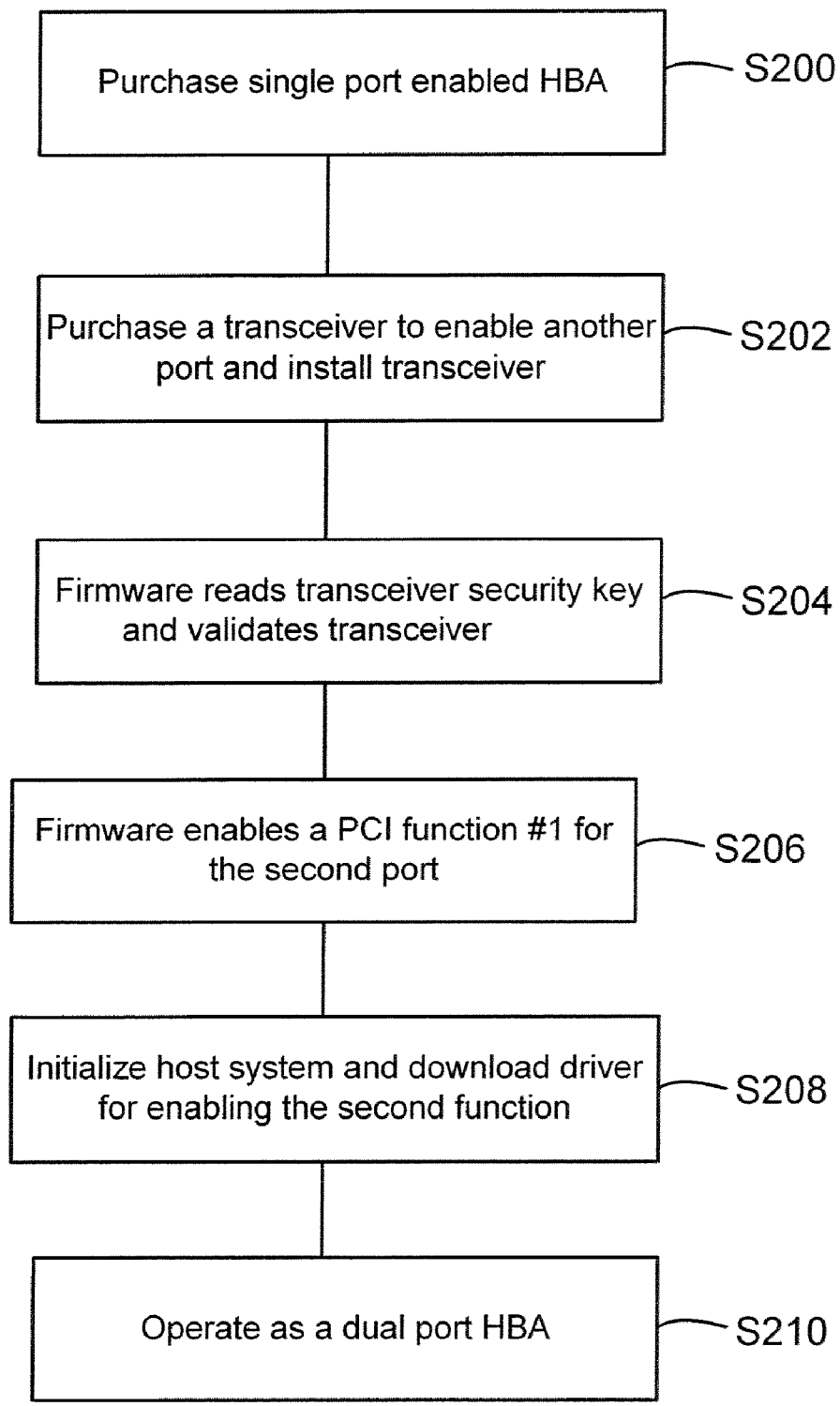
FIG. 2 shows a process flow for upgrading a single port HBA to a dual port HBA by validating a security key of a transceiver, according to one embodiment.

FIG. 2 outlines process steps for upgrading a single port HBA to a dual port HBA, according to one embodiment. The process starts in step S200, when a customer/user purchases a HBA with a single enabled port and at least one inactive port. To upgrade a single port HBA to a dual port HBA in step S202, the user purchases a custom transceiver 113 with a security key 113C and installs transceiver 113 in the inactive port (for example, Port II, 111).

In step S204, firmware 119 reads transceiver security key (113C) and validates transceiver 113. The validation ensures that authorized users are using only authorized transceivers.

HBA firmware 119 enables a PCI function (for example PCI function # 1) for the second port in step S206.

In step S208, host system 101 is initialized or rescans a PCI hierarchy to download (or initialize) driver 122 for enabling the second PCI function. In step S210, HBA 106 operates as a dual port HBA.

It is noteworthy that although the foregoing embodiments have been described with reference to upgrading single port HBA to a dual port HBA, it is within the scope and adaptive aspects of the present invention to upgrade from a single port HBA to a multi-port HBA.

Although the present invention has been described with reference to specific embodiments, these embodiments are illustrative only and not limiting. Many other applications and embodiments of the present invention will be apparent in light of this disclosure and the following claims. The foregoing adaptive aspects are useful for any networking environment where there is disparity between to link transfer rates.

What is claimed is:

1. A host bus adapter (HBA) operationally coupled to a host system, comprising:

an active port having a transceiver so that the active port is enabled for use in a storage area network; and an inactive port lacking a transceiver so that the inactive port is not enabled for use in the storage area network, but which may be enabled after a user acquires a transceiver with a built-in security key for activating the inactive port, wherein the HBA reads the built-in security key from the transceiver, validates the built-in security-key read from the acquired transceiver and presents a function to the host system based on which a driver for the function is initiated to enable the function for the inactive port.

2. The HBA of claim 1, wherein the host system operationally coupled to the HBA downloads a software component to enable the function for the inactive port.

3. The HBA of claim 1, wherein the function is a PCI function.

4. The HBA of claim 1, wherein the HBA operates in a Fibre Channel Network.

5. The HBA of claim 1, wherein firmware for the HBA reads the built-in security key from the acquired transceiver.

6. A method for upgrading a host bus adapter having an active port and an inactive port operationally coupled to a host system, wherein the active port includes a transceiver so that the active port is enabled for use in a storage area network, and the inactive port lacks a transceiver so that the inactive port is not enabled for use in the storage area network, the method comprising:
   acquiring a transceiver for the inactive port;
   coupling the acquired transceiver to the inactive port, wherein the acquired transceiver stores a built-in security key;
   validating the acquired transceiver by reading the built-in security key from the acquired transceiver;
   presenting a function to the host system based on which a driver for the inactive port is initiated;
   enabling the function for the inactive port;
   downloading a software component for the inactive port to activate the inactive port; and
   operating the host bus adapter with more than one functional port.

7. The method of claim 6, wherein the software component is a part of a HBA driver.

8. The method of claim 6, wherein the HBA operates in a Fibre Channel Network.

9. The method of claim 6, wherein HBA firmware reads the built-in security key.

10. A storage area network, comprising:
   a host system that reads and writes information to a storage system; and
   a host bus adapter (HBA) operationally coupled to the host system, the HBA including a first active port having a transceiver so that the active port is enabled for use in a storage area network; and an inactive port lacking a transceiver so that the inactive port is not enabled for use in the storage area network, but which may be enabled for use in the storage area network after a user acquires a transceiver with a built-in security key for activating the inactive port, wherein the HBA reads the built-in security key from the acquired transceiver, validates the built-in security key read from the acquired transceiver, and presents a function to the host system based on which a driver for a function is initiated, to enable the function for the inactive port.

11. The storage area network of claim 10, wherein the host system downloads a software component to enable the function for the inactive port.

12. The storage area network of claim 10, wherein the function is a PCI function.

13. The storage area network of claim 10, wherein the HBA operates in a Fibre Channel Network.

14. The storage area network of claim 10, wherein firmware for the HBA reads the built-in security key from the transceiver.

15. A network device, comprising:
   an active port having a transceiver so that the active port is enabled for use in a network; and
   an inactive port lacking a transceiver so that the inactive port is not enabled for use in a network, but which may be enabled after a user acquires a transceiver with a built-in security key; wherein the network device reads the built-in security key from the acquired transceiver, validates the built-in security-key read from the acquired transceiver, and presents a function to a computing system which initiates a driver for the function to enable the function for the inactive port.

16. The network device of claim 15, wherein the computing system operationally coupled to the network device downloads a software component to enable the function for the inactive port.

17. The network device of claim 15, wherein firmware for the network device stored in a non-volatile memory reads and validates the security key.

18. A method for enabling an inactive port in a network device, having at least one active port and the inactive port, wherein the active port includes a transceiver so that the active port is enabled for use in a network, and the inactive port lacks a transceiver so that the inactive port is not enabled for use in the network, the method comprising:
   acquiring a transceiver for the inactive port;
   coupling the acquired transceiver to the inactive port of the network device, wherein the acquired transceiver stores a built-in security key;
   validating the acquired transceiver by reading the security key from the acquired transceiver;
   presenting a function to a computing system;
   initiating a driver for a function for the inactive port;
   enabling the function for the inactive port:
   downloading a software component for the inactive port to enable the inactive port; and
   operating the network device with more than one functional port.

19. The method of claim 18, wherein the network device reads the security key.

* * * * *

UNITED STATES PATENT AND TRADEMARK OFFICE
CERTIFICATE OF CORRECTION

PATENT NO. : 8,095,978 B1  
APPLICATION NO. : 11/761279  
DATED : January 10, 2012  
INVENTOR(S) : Rajendra R. Gandhi et al.

Page 1 of 1

It is certified that error appears in the above-identified patent and that said Letters Patent is hereby corrected as shown below:

In column 4, line 60, after "between" delete "to".

In column 6, line 48, in Claim 18, delete "port:" and insert -- port; --, therefor.

Signed and Sealed this
Twentieth Day of March, 2012

David J. Kappos
*Director of the United States Patent and Trademark Office*